United States Patent
Cunningham et al.

(10) Patent No.: US 10,882,524 B2
(45) Date of Patent: Jan. 5, 2021

(54) SYSTEMS AND METHODS FOR VEHICLE LAUNCH CONTROL

(71) Applicant: Ford Global Technologies, LLC, Dearborn, MI (US)

(72) Inventors: Andrew Cunningham, Royal Oak, MI (US); Keith Weston, Canton, MI (US); Joshua Sharpe, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 149 days.

(21) Appl. No.: 15/893,351

(22) Filed: Feb. 9, 2018

(65) Prior Publication Data

US 2019/0248370 A1 Aug. 15, 2019

(51) Int. Cl.
*B60W 30/18* (2012.01)
*B60W 10/06* (2006.01)
(Continued)

(52) U.S. Cl.
CPC ...... *B60W 30/18027* (2013.01); *B60W 10/06* (2013.01); *B60W 10/18* (2013.01);
(Continued)

(58) Field of Classification Search
CPC ..... B60T 7/02; B60T 7/06; B60T 8/00; B60T 8/176; B60T 8/1763; B60T 8/1764; B60T 2210/10; B60T 2240/00; B60T 8/4809; B60T 8/50; B60T 8/52; B60T 8/56; B60W 30/18027; B60W 10/06; B60W 10/18; B60W 40/068; B60W 2530/20; B60W 2540/10; B60W 2550/148; B60W 2710/18; B60W 2720/26; B60C 23/0408;
(Continued)

(56) References Cited

U.S. PATENT DOCUMENTS 4,947,332 A   8/1990   Ghoneim
5,090,511 A   2/1992   Kabasin
(Continued)

OTHER PUBLICATIONS

"2017 Ford Mustang Launch Control, Line Lock, & Driving Modes," DPCcars Youtube Video, Screenshots of portion starting at 1:20 and ending at 1:43, Mar. 14, 2017, Available Online at https://www.youtube.com/watch?v=QWtlF3m_F7M, 8 pages.

*Primary Examiner* — Anthony R Jimenez
(74) *Attorney, Agent, or Firm* — Geoffrey Brumbaugh; McCoy Russell LLP

(57) ABSTRACT

Methods and systems are provided for launching a vehicle from rest in order to maximize performance for the vehicle launch event. In one example, a method comprises, in preparation of a launch of the vehicle driven by an engine from a resting state, rotating a set of vehicle tires via a controller by adjusting a torque of the engine while vehicle brakes are applied for a duration that is a function of real-time pressure sensor readings of the set of tires. In this way, tire temperature may be determined based on the real-time pressure sensor readings in order to control tire temperature to an optimal tire temperature for the launch event, where the optimal tire temperature is based on a coefficient of friction of the road surface the vehicle is launching from, and where the optimal tire temperature provides for optimal grip for the vehicle launch.

19 Claims, 4 Drawing Sheets

(51) Int. Cl.
  *B60W 10/18* (2012.01)
  *B60W 40/068* (2012.01)

(52) U.S. Cl.
  CPC ....... *B60W 40/068* (2013.01); *B60W 2530/20* (2013.01); *B60W 2540/10* (2013.01); *B60W 2552/40* (2020.02); *B60W 2710/0666* (2013.01); *B60W 2710/18* (2013.01); *B60W 2720/26* (2013.01)

(58) Field of Classification Search
  CPC ....... B60C 23/00; B60C 23/01; B60C 23/002; B60C 23/02; B60C 23/04; B60C 23/0401; B60C 23/0422; B60C 23/0433; B60C 23/0442; B60C 23/06; B60C 23/061; B60C 23/063; B60C 23/064; B60L 3/00; B60L 3/0038; B60L 3/0076; B60L 15/00; B60L 15/10; B60L 15/20; B60L 2220/00; B60L 2240/46; B60L 2240/461; B60L 2240/463; B60L 2240/465; B60L 2260/20; B60L 2260/22; F02D 11/00; F02D 11/101; F02D 11/105; F02D 29/00; F02D 31/00; F02D 31/001; F02D 31/003; F02D 31/008; F02D 31/009; F02D 35/00; F02D 35/007; F02D 41/00; F02D 41/02; F02D 41/007; F02D 41/14; F02D 41/1401; F02D 41/1412; F02D 41/1438; F02D 41/1439; F02D 41/1441; F02D 41/1445; F02D 2200/501; F02D 2200/101; F02D 2200/1006; F02D 2200/702; F02D 2250/00
  USPC .......................................................... 701/48
  See application file for complete search history.

(56) References Cited

U.S. PATENT DOCUMENTS

| | | | |
|---|---|---|---|
| 6,498,967 B1 * | 12/2002 | Hopkins | ............. B60C 23/0408 340/442 |
| 6,829,529 B2 * | 12/2004 | Trefzer | ................. B60K 28/16 180/244 |
| 8,175,785 B2 | 5/2012 | Turski et al. | |
| 9,254,748 B2 | 2/2016 | Stevens | |
| 2009/0107748 A1 * | 4/2009 | Luehrsen | ................ B60T 8/175 180/197 |
| 2015/0005982 A1 * | 1/2015 | Muthukumar | .......... G01P 15/00 701/1 |

* cited by examiner

SYSTEMS AND METHODS FOR VEHICLE LAUNCH CONTROL

FIELD

The present description relates generally to methods and systems for controlling a vehicle engine to optimize tire grip for vehicle launch events.

BACKGROUND/SUMMARY

It is known to provide motor vehicles with a launch control system for launching the vehicle from a stationary position. The launch control system typically controls speed of an internal combustion engine and transmission upshifts. In one example, the launch control system may be activated, for example, by a vehicle operator depressing a launch control button and selecting a sport mode for the vehicle, or engaging a launch control sequence via an application (e.g. Track Apps) selectable via a human-machine interface (HMI).

Once activated, the vehicle operator may depress a brake pedal to hold the vehicle stationary, and the acceleration pedal (e.g. pedal that controls an air intake throttle) may be depressed to increase engine speed. The launch control system controls the engine speed, and the driver then may rapidly release the brake pedal, allowing the vehicle to accelerate.

An example of systems and methods for performance launch control of a vehicle is described in U.S. Pat. No. 8,175,785. Therein, a user interface subsystem is configured to receive a user-selected driving condition indicative of current road conditions, a vehicle sensor subsystem configured to collect real-time vehicle status data during operation of the vehicle, a propulsion system configured to generate torque for the drive wheels of the vehicle, and a controller. The controller is configured to generate a target wheel slip profile for the vehicle based upon the user-selected driving condition setting and the real-time vehicle status data, calculate a torque limit for the propulsion system, and to dynamically regulate actual torque of the propulsion system in response to the target wheel slip profile and the torque limit. Furthermore, such a system takes into account tire traction as a function of the user-selected driving condition and real-time vehicle status data, which is used to determine the torque limit for dynamically regulating actual torque of the propulsion system.

However, the inventor herein have recognized potential issues with system an approach. Specifically, the systems and methods of U.S. Pat. No. 8,175,785 do not provide for optimization of tire temperature in order to optimize tire grip for varying coefficients of friction for a particular track surface and tire surface. Thus, the inventors herein have developed systems and methods to address such issues. In one example, a method comprises in preparation of a launch of a vehicle driven by an engine from rest, spinning a set of vehicle tires via a controller by adjusting a torque of the engine while vehicle brakes are applied for a duration that is a function of real-time pressure sensor readings of the set of tires. In this way, vehicle launch events may be controlled for maximum performance.

In one example, the set of tires includes tires coupled to driven wheels, and applying brakes for the duration includes applying brakes to non-driven wheels. By applying brakes to non-driven wheels, the driven wheels may rotate while the vehicle is maintained in place.

As another example, such a method may further comprise converting the real-time pressure sensor readings to temperature readings. In such an example, the duration is thus dependent on a timeframe for the set of tires reaching a pressure corresponding to a threshold tire temperature. The threshold tire temperature may comprise an optimal tire temperature for grip during the launch event, and may be based on a coefficient of friction for a road surface that the vehicle is launching from. For example, a speed of wheels that are coupled to the set of tires may be indicated while the set of tires is spinning, such that the coefficient of friction may be determined as a function of at least the speed of wheels coupled to the set of tires, and the torque of the engine. In some examples, the coefficient of friction may be additionally determined as a function of temperature, and as such, input from the pressure sensors (in order to convert the pressure sensor readings to temperature) may be taken into account when determining the coefficient of friction. Furthermore, the controller may request a vehicle operator to depress an accelerator pedal when conditions are met for launching the vehicle, and responsive to an indication that the vehicle operator has depressed the accelerator pedal, the controller may control the torque of the engine just after the duration as a function of the road surface and the threshold tire temperature to propel the vehicle forward. In this way, grip during launch may be maximized for the particular road surface the vehicle is launching from, which may result in optimal acceleration from rest, when such performance is desired by the vehicle operator.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
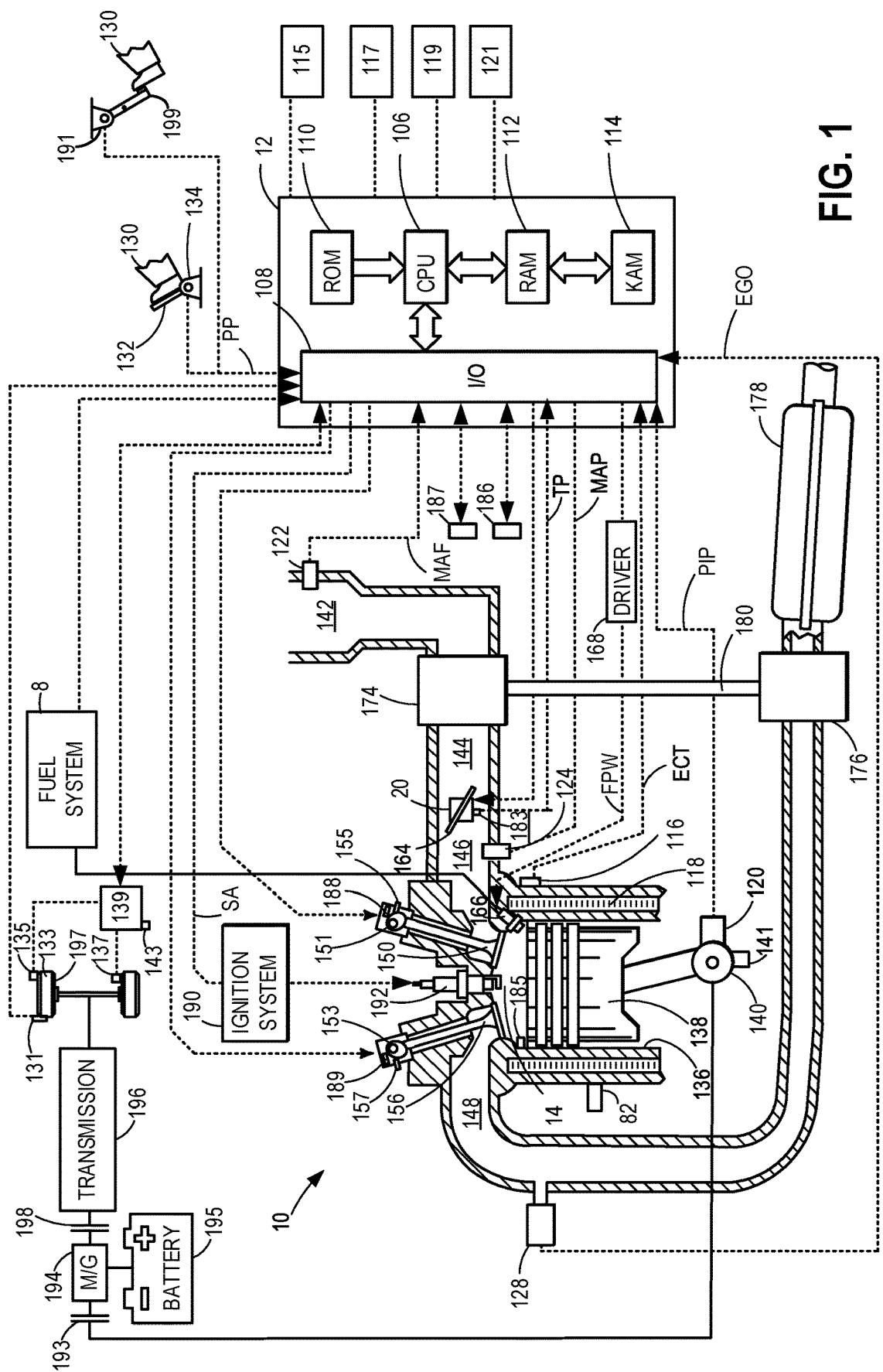
FIG. 1 depicts an example illustration of an engine system in a vehicle propulsion system.
Figure 2:
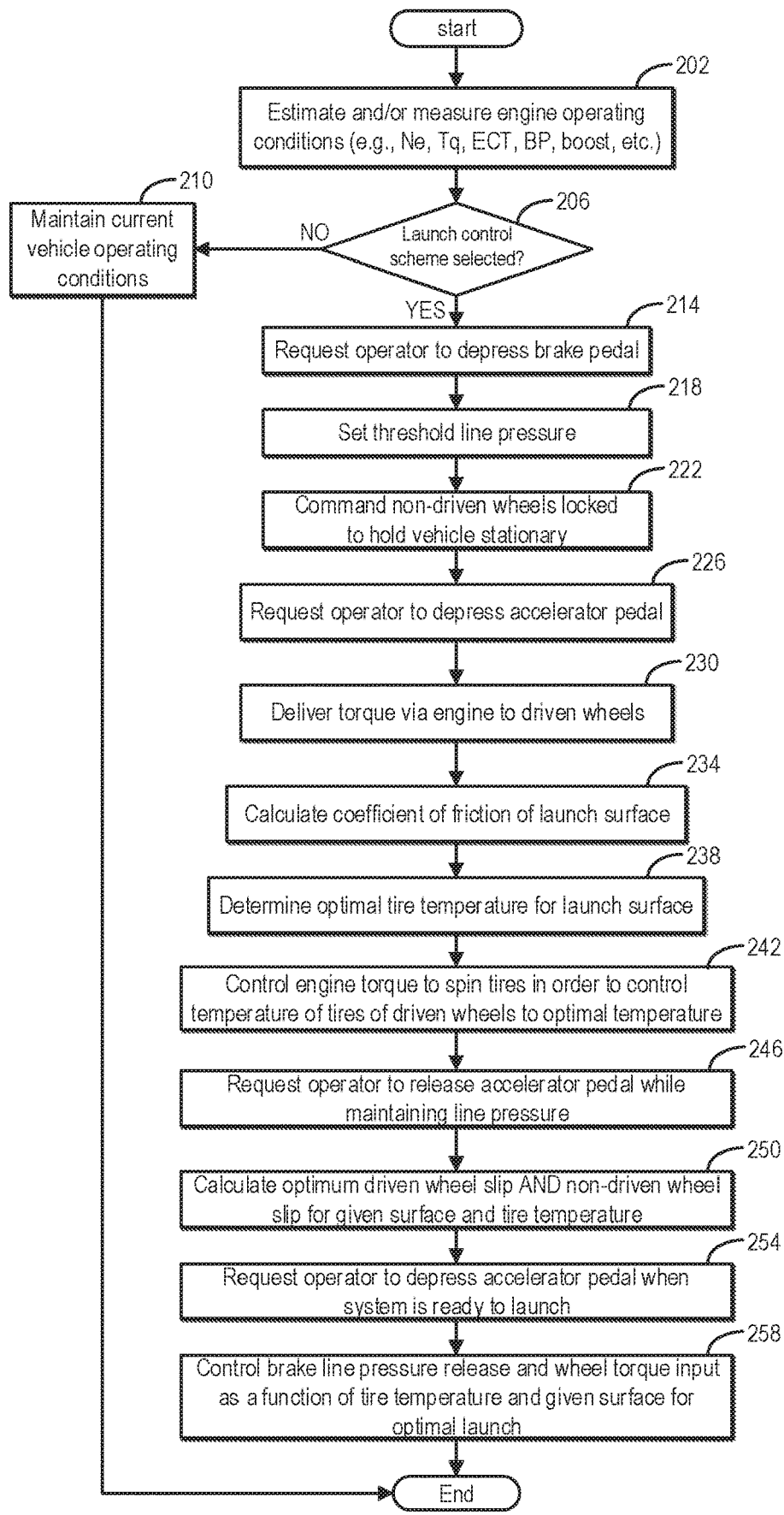
FIG. 2 depicts an example method for conducting a vehicle launch event.
Figure 3:
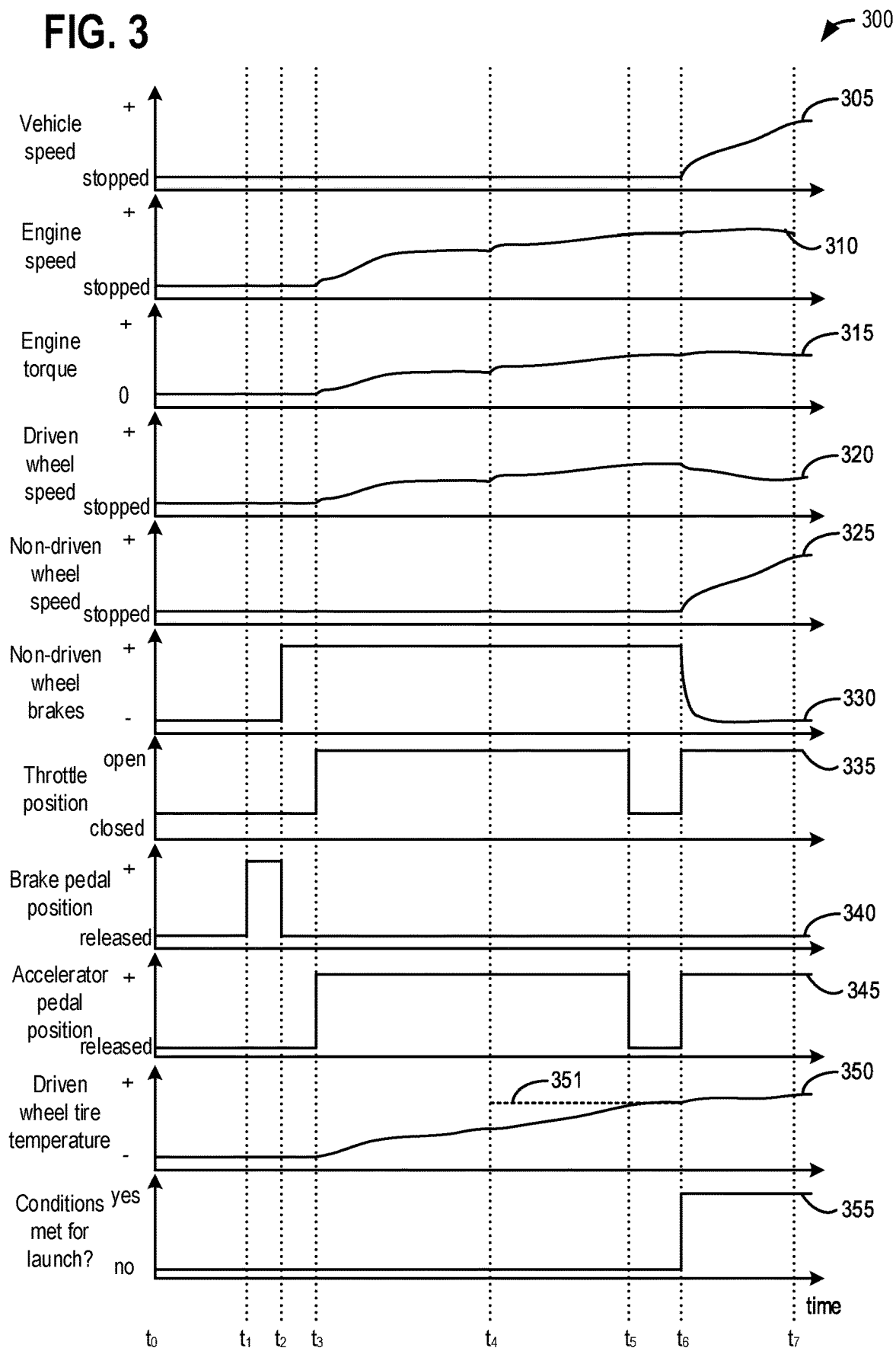
FIG. 3 depicts an example timeline for conducting a vehicle launch event, according to the method of FIG. 2.
Figure 4:
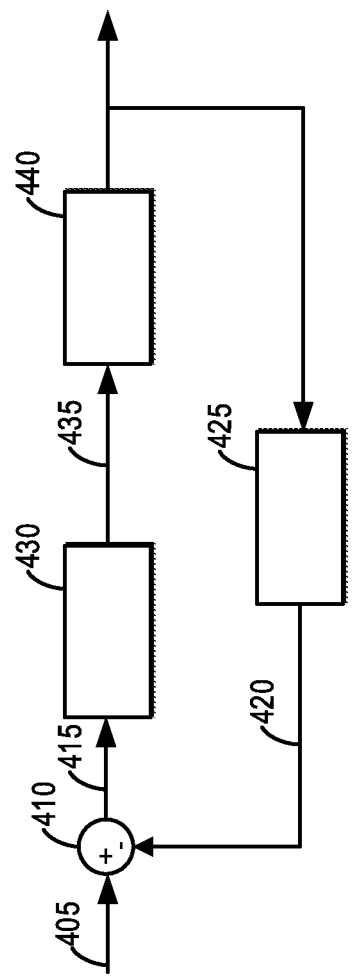
FIG. 4 depicts an example proportional integral derivative (PID) controller for controlling tire temperature to an optimal tire temperature for a vehicle launch event, according to the method of FIG. 2.

The following description relates to systems and methods for controlling a vehicle during a vehicle launch event. More specifically, the systems and methods described herein relate to optimizing tire temperature for tires corresponding to driven wheels of a vehicle, as a function of road surface, in order to enable a maximum grip for the tires at the time of launch from standstill. Accordingly, an engine system for a vehicle is depicted at FIG. 1, the engine system coupled to one or more wheels, the one or more wheels including tires which may include tire pressure monitoring sensor(s) (TPMS), which may be used to indicate tire temperature for a vehicle launch event. A method for controlling tire temperature during a vehicle launch event is depicted at FIG. 2, and a timeline for such a method is depicted at FIG. 3. In one example, a proportional integral derivative (PID) controller may be utilized to control tire temperature to the optimal tire temperature for a particular launch event, where tire temperature is controlled at least in part via the engine transferring torque to the driven wheels. An example depiction of such a PID controller is depicted at FIG. 4.

FIG. 1 depicts an example embodiment of a combustion chamber or cylinder of internal combustion engine 10. Engine 10 may receive control parameters from a control system including controller 12 and input from a human operator 130 via an input device 132, or via an autonomous controller. In this example, input device 132 includes an accelerator pedal and a pedal position sensor 134 for generating a proportional pedal position signal PP. Similarly, controller 12 may receive an indication of an operator requested vehicle braking via operator 130, or an autonomous controller. For example, controller 12 may receive sensory feedback from pedal position sensor 191 which communicates with brake pedal 199.

Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel (for example) to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174. In one example, throttle 20 may be controlled or actuated to various positions electronically, under control of controller 12.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark timing, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Cam actuation system 151 may include first camshaft sensor(s) 188. Similarly, exhaust valve 156 may be controlled by controller 12 via cam actuation system 153. Cam actuation system 153 may include second camshaft sensor(s) 189. In some examples, one or more of first camshaft sensor 188 and second camshaft sensor 189 may be utilized to determine piston location, for example whether the piston is at top dead center or bottom dead center, or somewhere in between. In some examples, such a determination may be provided in conjunction with data received via the controller from crankshaft position sensor 120. It may be understood that in FIG. 1, a camshaft is not shown, but engine 10 may include a camshaft. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems, or may additionally include the exhaust valve controlled via electric valve actuation. In still other embodiments, the intake and exhaust valves may be controlled by a common valve actuator or actuation system, or a variable valve timing actuator or actuation system.

In some examples, one or more reaction torque sensors 141 may be coupled to the crankshaft, and may enable a determination of engine torque. In other examples, engine torque is calculated from MAF.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tank(s), fuel pump(s), and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two or more injectors (for example, a direct injector and a port injector, two direct injectors, or two port injectors) and varying a relative amount of injection from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Engine 10 may further include a knock sensor 82 coupled to each cylinder 14 for identifying abnormal cylinder combustion events. In alternate embodiments, one or more knock sensors 82 may be coupled to selected locations of the engine block. The knock sensor may be an accelerometer on the cylinder block, or an ionization sensor configured in the spark plug of each cylinder. The output of the knock sensor may be combined with the output of a crankshaft acceleration sensor to indicate an abnormal combustion event in the cylinder. In one example, based on the output of knock sensor 82 in one or more defined windows (e.g., crank angle timing windows), abnormal combustion due to one or more of knock and pre-ignition may be detected and differentiated. As an example, pre-ignition may be indicated in response to knock sensor signals that are generated in an earlier window (e.g., before a cylinder spark event) while knock may be indicated in response to knock sensor signals that are generated in a later window (e.g., after the cylinder spark event). Further, pre-ignition may be indicated in response to knock sensor output signals that are larger (e.g., higher than a first threshold), and/or less frequent while knock may be indicated in response to knock sensor output signals that are smaller (e.g., higher than a second threshold, the second threshold lower than the first threshold) and/or more frequent.

In addition, a mitigating action applied may be adjusted based on whether the abnormal combustion was due to knock or pre-ignition. For example, knock may be addressed using spark retard and EGR while pre-ignition is addressed using cylinder enrichment, cylinder enleanment, engine load limiting, and/or delivery of cooled external EGR.

One or more of fuel injector 166, intake valve 150, and exhaust valve 156 may be selectively deactivatable. For example, during conditions when the full torque capability of the engine is not needed, such as low load conditions, cylinder 14 may be selectively deactivated by disabling cylinder fueling and/or the operation of the cylinder's intake and exhaust valves. As such, remaining cylinders that are not deactivated may continue to operate and the engine may continue to spin.

Controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; engine oil temperature from temperature sensor 187; oil quality from oil quality sensor 186; a profile ignition pickup signal (PIP) from Hall effect sensor 120 (or other type) (also referred to herein as crankshaft position sensor) coupled to crankshaft 140; throttle position (TP) from a throttle position sensor 183; absolute manifold pressure signal (MAP) from sensor 124, cylinder AFR from EGO sensor 128, and abnormal combustion from knock sensor 82 and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

As mentioned, engine 10 may include an oil life indicator, or oil quality sensor 186. Oil quality sensor 186 may comprise one or more sensors that may measure conductivity of oil, mechanical properties of the oil, soot concentration in the oil, presence and/or amount of water in the oil, etc. For example, measurement of conductivity may include how easily electric current passes through the oil, to enable a determination as to abundance of contaminants in the oil (e.g. lower the resistance, the more contaminants). Measurement of mechanical properties may include a piezoelectric sensor, which may enable determination of how thick the oil is.

In some examples, engine 10 may further include an in-cylinder pressure sensor 185. In-cylinder pressure sensor may be configured to send data related to pressure in the cylinder, to the controller.

Storage medium read-only memory 110 can be programmed with computer readable data representing instructions executable by processor 106 for performing the methods described below as well as other variants that are anticipated but not specifically listed. Example routines are shown with reference to FIG. 2.

In some examples, engine 10 may be included in a hybrid vehicle with multiple sources of torque available to one or more vehicle wheels 197. In other examples, engine 10 may be included in a vehicle with an engine being the sole source of torque available to the wheels. In the example shown, the vehicle includes engine 10 and an electric machine 194. Electric machine 194 may be a motor or a motor/generator. Crankshaft 140 of engine 10 and electric machine 194 are connected via a transmission 196 to vehicle wheels 197 when one or more clutches are engaged. In the depicted example, a first clutch 193 is provided between crankshaft 140 and electric machine 194, and a second clutch 198 is provided between electric machine 194 and transmission 196. Controller 12 may send a signal to an actuator (not shown) of each clutch (e.g. 193, 198) to engage or disengage the clutch(s), so as to connect or disconnect crankshaft 140 from electric machine 194 and the components connected thereto, and/or connect or disconnect electric machine 194 from transmission 196 and the components connected thereto. Furthermore, the controller may control clutch 193 and 194, to connect or disconnect engine 10 from the transmission and wheels. Transmission 196 may be a gearbox, a planetary gear system, or another type of transmission. In one example, transmission 196 may comprise a dual clutch transmission (DCT). The powertrain may be configured in various manners including as a parallel, a series, or a series-parallel hybrid vehicle.

Electric machine 194 receives electrical power from a traction battery 195 to provide torque to vehicle wheels 197. Electric machine 194 may also be operated as a generator to provide electrical power to charge battery 195, for example during a braking operation.

As discussed, in some examples, the powertrain may not include an electric machine in the driveline, without departing from the scope of this disclosure.

One or more tire pressure monitoring sensors 131 (TPMS) may be coupled to one or more tires 133 of wheels 197 in the vehicle. TPMS 131 may comprise an electronic system configured to monitor air pressure inside tires 133. Such information may be used to report real-time tire-pressure information to the operator of the vehicle, either via a gauge, a pictogram display, or warning light, for example. While only two wheels are illustrated, it may be understood that the vehicle may include four wheels. Herein, wheels that transfer torque (from the engine and/or electric machine) to propel the vehicle are referred to as driven wheels, whereas wheels that do not transfer torque to propel the vehicle are referred to as non-driven wheels.

As an example, the TPMS 131 may comprise what is referred to as a direct TPMS. In such an example, pressure sensors (e.g. 131) may be provided for each tire, and each pressor sensor may report tire pressure to the controller 12. In some examples, the TPMS may enable a determination of tire temperature, based on the relationship PV=nRT, otherwise known as the ideal gas equation, where P is pressure, V is volume, n is the amount of gas in moles, R is the universal gas constant, and T is absolute temperature of the gas. Thus, in examples where pressure of particular tires is measured via TPMS 131, a determination of tire temperature may additionally made via the controller 12.

In another example, the TPMS may comprise an indirect TPMS, which, rather than using physical pressure sensors, may infer tire pressure by monitoring individual wheel speeds via wheel speed sensor(s) 135 and other signals available outside the tire itself.

Each of wheels 197 may include a brake 137. Brake(s) 137 and wheel speed sensors 135, for example, may comprise part of an antilock brake system (ABS) 139. The ABS may further include at least two hydraulic valves (not shown) within brake hydraulics (not shown). The ABS may further include one or more brake lines (not shown) that includes hydraulic fluid for activating/deactivating brakes, with a pressure sensor 143 for indicating pressure in the brake line. Controller 12 may monitor rotational speed of each wheel, and, in one example, responsive to detection of a wheel rotating significantly slower than the others, the ABS 139 may be controlled to reduce hydraulic pressure to the brake 137 at the affected wheel, thus reducing the braking force on said wheel. Alternatively, responsive to detection of a wheel rotating significantly faster than the others, the ABS 139 may be controlled to increase hydraulic pressure to the brake at the affected wheel, thus increasing the braking force on said wheel. In still further cases, as will be discussed in detail below, ABS 139 may command an increased brake pressure at one or more wheels in order to conduct vehicle launch procedure. Herein, increasing brake pressure at one or more wheels via ABS 139 may be referred to as activating one or more wheel brakes. It may be understood that the ABS may be controlled electronically, via the controller and/or ABS module 119 (see below).

Furthermore, in some examples, various powertrain components described above with regard to FIG. 1, may be supervised by controller 12 with local control for the engine provided via engine controller 115, local control for the transmission provided via transmission controller 117, local control for the brake system (e.g. 139) provided via ABS module 119, and local control of the electronic accessories in a body of the vehicle provided via electric control unit (ECU) or body control module (BCM) 121.

As discussed above, for particular vehicles including performance vehicles, it may be desirable for launch control schemes to maximize traction for a standing start, for smooth, consistent starts. Such schemes may include an ability to select an engine speed (e.g. RPM) to launch the vehicle at, for example, for controlling an amount of torque provided to driven wheels, which may further be a function of wheel spin and/or wheel slip.

In some examples, launch schemes may enable a vehicle operator to select a mode whereby the tires may be spun prior to launching the vehicle, to raise temperature of the tires in order to improve traction upon launching the vehicle. However, while it is known that raising tire pressure may increase tire traction, the inventors have herein recognized that prior art systems and methods may not result in an optimal tire temperature for a particular launch event, as a function of a coefficient of friction for the road (for example, a track), and for the tire. Thus, such prior art methods may not result in tires maximally gripping the road surface, which may result in launch scenarios that are not optimal. Thus, it is desirable to obtain information at a launch event pertaining to such coefficients of friction, and based on the obtained information, control tire spin to an optimal tire temperature just prior to launching the vehicle such that maximum grip of tires to the road surface is enabled for such a launch event.

Accordingly, referring to FIG. 1, the system depicted may enable a system for a vehicle comprising an engine, a first set of tires coupled to a first set of wheels, and a second set of tires coupled to a second set of wheels. One or more tire pressure monitoring sensors may be coupled to at least the first set of tires. An antilock brake system including one or more brakes may be coupled to the second set of tires. The system may include a controller, the controller storing instructions in non-transitory memory that, when executed, cause the controller to, at a vehicle launch event, perform the following sequence of actions. The controller may electronically lock the second set of tires via the one or more brakes coupled to the second set of tires. With the one or more brakes engaged, thus locking the second set of tires, the controller may request a vehicle operator to step down fully on an accelerator pedal to deliver engine torque from the engine to the first set of tires. In this way, the first set of tires may rotate in place. With the first set of tires rotating in place, the controller may determine an optimal tire temperature for the first set of tires as a function of the given coefficient of friction. The controller may thus regulate engine torque to control temperature of the first set of tires to the optimal tire temperature while maintaining the second set of tires electronically locked, where controlling temperature of the first set of tires may include monitoring pressure in the first set of tires via the tire pressure monitoring sensors, and converting pressure readings to temperature readings.

Such a system may further comprise one or more reaction torque sensors for measuring engine torque, and one or more first wheel speed sensors coupled to the first set of wheels. The controller may store further instructions to calculate the coefficient of friction for the road surface while the first set of tires is rotating in place, based on measured engine torque and speed of the first set of wheels.

In such a system, the controller may store further instructions to calculate a first target wheel slip profile for the first set of tires, and calculate a second target wheel slip profile for the second set of tires, while controlling temperature of the first set of tires to the optimal tire temperature while maintaining the second set of tires electronically locked. In such an example, the controller may store further instructions to calculate the first wheel slip profile and the second wheel slip profile based on the optimal tire temperature and the coefficient of friction of the road surface. The controller may store further instructions to calculate the first wheel slip profile and the second wheel slip profile based on the optimal tire temperature and the coefficient of friction of the road surface. Still further, the controller may store additional instructions to, in response to temperature of the first set of tires being substantially equivalent to the optimal tire temperature, conduct a controlled release of the one or more brakes coupled to the second set of tires and regulate engine torque in order to control the first set of tires to the first target wheel slip profile, and to control the second set of tires to the second target wheel slip profile, to launch the vehicle.

Accordingly, turning now to FIG. 2, a flowchart for a high-level example method 200 for controlling a vehicle launch event, is shown. Specifically, the method may include spinning driven wheels with non-driven wheels electronically locked in place, in order to obtain one or more measurements related to a coefficients of friction for the road surface the vehicle is launching from. Responsive to the indicated measurement(s), the method may include controlling the spinning of the tires in such a way as to optimize tire temperature for optimal grip for the given road surface. Controlling the tires to the optimal tire temperature may be conducted via a feed-back loop that relies on tire temperature as monitored via tire pressure monitoring sensors (TPMS) (e.g. 131), for example, where engine torque is controlled based on the difference between the optimal tire temperature and the actual tire temperature, in order to control tire temperature to the optimal temperature. Thus, a duration of time that the non-driven wheels are electronically locked in place may be variable, depending on the road surface and how long it takes for the tire temperature to be controlled to the optimal tire temperature for the launch event. Method 200 will be described in reference to the system described in FIG. 1, though it should be understood that method 200 may be applied to other systems without departing from the scope of this disclosure. Method 200 may be carried out by a controller, such as controller 12, and may be stored as executable instructions in non-transitory memory. Instructions for carrying out method 200 and the rest of the methods included herein may be executed by the controller based on instructions stored on a memory of the controller and in conjunction with signals received from sensors of the vehicle system, such as the sensors described above with reference to FIG. 1. The controller may employ engine system actuators such as spark plug(s) (e.g. 192), fuel injector(s) (e.g. 166), throttle (e.g. 20), etc., according to the method depicted below.

Method 200 begins at 202, and may include estimating and/or measuring engine operating conditions. These may include, for example, engine speed, desired torque (for example, from a pedal-position sensor), manifold pressure (MAP), mass air flow (MAF), BP, engine temperature, catalyst temperature, intake temperature, spark timing, air temperature, knock limits, engine coolant temperature (ECT), barometric pressure (BP), boost conditions, etc.

Proceeding to 206, method 200 may include indicating whether a launch control scheme or mode has been selected. For example, a launch control mode may be selected via a vehicle operator, through a button on a dash of the vehicle, a human machine interface (HIM) such as a screen, via a personal computing device (e.g. smart phone, tablet, laptop, etc.) in communication (e.g. wireless or wired communication) with the controller of the vehicle and where the personal computing device may include an application for enabling selection of the launch control mode, etc. In some examples, the launch control mode may include the vehicle operator inputting a desired engine RPM for the vehicle to launch at.

If, at 206, launch control mode has not been selected via the vehicle operator, then method 200 may proceed to 210, and may include maintaining current vehicle operating conditions. For example, if the vehicle is in motion, then the engine and/or electric motor may be maintained in their current status to propel the vehicle. If the vehicle is off, then such conditions may be maintained. Still further, the vehicle may be about to conduct a launch event, but where the launch mode has not been selected. In such a circumstance, the vehicle may control launch differently than the method of FIG. 2. Accordingly, method 200 may end.

Returning to 206, responsive to the launch control mode or scheme being indicated to be selected via the vehicle operator, method 200 may proceed to 214. At 214, method 200 may include requesting the operator to depress the brake pedal, in order to determine a threshold brake line pressure for holding the vehicle steady during the launch. While not explicitly illustrated, responsive to the request to depress the brake pedal, brake line pressure may be monitored, for example, via a pressure sensor positioned in a brake line. Based on the pressure monitored in the brake line in response to the request of the vehicle operator to depress the brake pedal, a threshold line pressure may be set via the controller and/or ABS module. Accordingly, proceeding to 218, method 200 may include setting the threshold line pressure as a function of line pressure monitored in response to the request of the vehicle operator to depress the brake pedal. Such a value may be stored at the controller and/or ABS module.

With the threshold line pressure set at 218, method 200 may proceed to 222. At 222, method 200 may include commanding non-driven wheels locked, in order to hold the vehicle stationary during a portion of the launch event. With the non-driven wheels locked, an indication may be provided via the controller to the vehicle operator that the brake pedal may be released. To lock non-driven wheels, the ABS system may be controlled via the controller and/or ABS module, to activate brakes coupled to non-driven wheels, but not activate brakes coupled to driven wheels, where driven wheels include those receiving torque from the engine and/or electric machine. In other words, for a rear-wheel drive vehicle, the rear wheels may be understood to comprise driven wheels, whereas the front wheels may comprise non-driven wheels. Thus, at 222, locking non-driven wheels may comprise activating brakes coupled to non-driven wheels electronically via the controller and/or ABS module, where activating brakes includes supplying at least the threshold line pressure (indicated at step 218) to brakes coupled to the non-driven wheels via the ABS system. Said another way, locking the wheels at 222 may include preventing the wheels from rotating, even when the engine is under load, and operating to propel the vehicle. As will be discussed in detail below, locking the non-driven wheels may allow for driven wheels to spin, which may thus enable calculations of road surface friction and tire temperature. The non-driven wheels may be locked for a duration that is variable, depending on a duration of time it takes to optimize tire temperature as a function of the road surface, as will be discussed in further detail below.

Proceeding to 226, method 200 may include requesting the vehicle operator to depress the accelerator pedal (via an HMI, audible message, etc.). It may be understood that the request may include requesting the operator to depress the accelerator pedal all the way to the floor, or to a maximum amount possible. In this way, the vehicle operator may control a position of an air intake throttle (e.g. 20), to a wide-open throttle (WOT) position.

Proceeding to 230, with the accelerator pedal depressed, engine torque may be communicated to the driven wheels. However, because the non-driven wheels are locked, the driven wheels, responding to engine torque commanded via the vehicle operator stepping down on the accelerator pedal, may rapidly spin or rotate while the vehicle remains stationary.

With engine torque being communicated to the driven wheels via the operator depressing the accelerator pedal, method 200 may proceed to 234. At 234, method 200 may include calculating a coefficient of friction for the particular road surface the vehicle is launching from. More specifically, with the driven wheels spinning, engine torque may be monitored, as well as wheel speed. Engine torque may, for example, be estimated or inferred based on measurements made via one or more reaction torque sensor(s) (e.g. 141), and in some examples in conjunction with data acquired via a crankshaft position sensor (e.g. 120) while the engine is in operation. Engine torque may additionally or alternatively be calculated via MAF. Furthermore, wheel speed may also be monitored, via, for example, one or more wheel speed sensor(s) (e.g. 135). Based on the determined engine torque and wheel speed, a coefficient of friction for the road surface may be indicated. It may be understood that the coefficient of friction may vary with temperature, and thus in some examples, determining the coefficient of friction may include input from the TPMS (e.g. 131). In some examples, a lookup table may be stored at the controller, where responsive to a determination of engine torque and wheel speed, such a lookup table may be queried via the controller, to indicate a particular coefficient of friction based on the engine torque and wheel speed. In this way, a coefficient of friction may be determined at each launch event of the vehicle where the vehicle operator selects the launch mode.

With the coefficient of friction determined for the particular road surface as a function of engine torque and wheel speed, method 200 may proceed to 238. At 238, method 200 may include determining an optimal tire temperature for the tires coupled to the driven wheels, for maximum grip of tires during the launch, as a function of the determined coefficient of friction. The optimal tire temperature may comprise a threshold tire temperature, for example. Such a value or threshold may be empirically determined, in some examples, and may be stored at a lookup table at the controller as a function of the coefficient of friction. In other examples, additionally or alternatively, a mathematical relationship between the coefficient of friction and optimal tire temperature for maximum grip, may be utilized via the controller in order to determine the optimal tire temperature for the particular road surface. In some examples, the optimal tire temperature may further be a function of ambient conditions, such as humidity, ambient temperature, precipitation, etc.

In response to determining the optimal tire temperature for the launch event to maximize grip, method 200 may proceed to 242. At 242, method 200 may include controlling engine torque such that the tires coupled to the driven wheels are spun in a fashion where the temperature of the tires is controlled to the optimal tire temperature or, in other words, controlled to the threshold tire temperature. Thus, at 242, method 200 may include indicating a temperature of the tires coupled to the driven wheels. Such an indication may be provided to the controller via the TPMS (e.g. 131), for example. In other words, the TPMS may monitor pressure of the tires coupled to driven wheels, which may then be converted to tire temperature. Accordingly, at 242, method 200 may include determining whether current tire temperature is above, or below the optimal tire temperature or threshold tire temperature. If the current tire temperature, or actual tire temperature, is below the threshold tire temperature, then engine speed and engine torque may be controlled such that wheel speed increases, which may thus increase tire temperature as the tires rotate against the road surface. Increasing engine torque may include controlling fuel injection and spark such that engine torque increases, for example. As one example, spark may be advanced and extra fuel may be provided, which may increase torque (even in a case where the throttle is fully open). In another example, if the current tire temperature is above the threshold tire temperature, then engine speed and engine torque may be controlled such that wheel speed decreases, which may thus decrease tire temperature as the tires rotate against the road surface. In some examples, the throttle may be electronically controlled or modulated via the controller to increase (or decrease) engine torque as a function of throttle position. It may be understood that such action may be independent of the vehicle operator. In other words, such action may be under control of the vehicle controller, where the throttle may be modulated via drive-by-wire throttle body. However, there may be other examples where throttle position may be controlled via the vehicle operator in order to increase or decrease engine torque, in response to requests from the controller to the vehicle operator to press down on the accelerator pedal or release the accelerator pedal, to varying degrees.

Proceeding to 246, method 200 may include requesting the vehicle operator to release the accelerator pedal while maintaining brake line pressure to non-driven wheels.

Continuing to 250, method 200 may include determining an optimal wheel slip for both the driven wheels and for the non-driven wheels, for the given coefficient of friction and optimal tire temperature. Such a determination may be made via querying one or more lookup tables stored at the controller of the vehicle. For example, a lookup table may include information related to optimal driven wheel slip for the launch event as a function of the coefficient of friction and optimal tire temperature. Similarly, another lookup table may include information related to optimal non-driven wheel slip for the launch event as a function of the coefficient of friction and optimal tire temperature. By determining wheel slip for driven and for non-driven wheels, an acceleration profile of the vehicle during the launch event may be maximized, as at least some amount of wheel slip for both driven and non-driven wheels may be beneficial in terms of the vehicle maximally accelerating from a standstill (as opposed to a case where wheel slip was avoided).

It may be understood that, because the driven wheels are rotating while the non-driven wheels are held stationary prior to the vehicle being propelled forward, temperature of the non-driven wheels may be lower than temperature of the driven wheels. In other words, with temperature of the non-driven wheels being different, an amount of wheel slip for the non-driven wheels may be a function of the current tire temperature for non-driven wheels as it relates to the coefficient of friction.

Thus, an optimal amount of wheel slip for driven and non-driven wheels may be functions of one or more of the coefficient of friction, optimal driven wheel tire temperature, and current non-driven wheel tire temperature. The optimal amount of wheel slip for driven and/or non-driven wheels may further be a function of engine torque and/or engine speed. The optimal amount of wheel slip may still further be a function of ambient temperature and/or other ambient conditions.

With the optimal amount of wheel slip determined for the particular launch event, for both driven wheels and non-driven wheels, method 200 may proceed to 254. At 254, method 200 may include requesting the vehicle operator to again depress the accelerator pedal, where such a request may include requesting the vehicle operator to depress the accelerator pedal to the floor, or to a maximum amount.

Such a request may be provided to the vehicle operator once the tires have been controlled to the optimal tire temperature for the driven wheels, and when an optimum wheel slip target has been determined for both driven and non-driven wheels. In other words, such a request may be provided responsive to the controller indicating that the vehicle is ready to launch (e.g. be propelled forward) from the standstill.

It may be understood that in controlling tire temperature to the optimal tire temperature, it may be indicated that tire temperature is at the optimal tire temperature provided tire temperature is within a predetermined range of the optimal tire temperature. Thus, herein, tire temperature being at the optimal tire temperature may include tire temperature being substantially equivalent to the optimal tire temperature, where substantially equivalent may include tire temperature within 3 degrees or less, 2 degrees or less, or 1 degree or less, of the optimal tire temperature, and where degrees may be in Celsius or Fahrenheit, for example.

With the accelerator pedal depressed, method 250 may proceed to 258. At 258, method 200 may include controlling the release of brake line pressure for non-driven wheels, and additionally controlling wheel torque input for driven wheels, as a function of the tire temperature and coefficient of friction for the given surface, to launch the vehicle. More specifically, as discussed above at 250, method 200 may include calculating optimal driven wheel slip and non-driven wheel slip for the given road surface and tire temperature. Accordingly, at 258, method 200 may include controlling the release of brake line pressure for non-driven wheels, such that wheel slip for non-driven wheels correlates (e.g. within 5% or less) with the non-driven wheel slip calculated at step 250. Furthermore, at 258 method 200 may include controlling engine torque to achieve the driven wheel slip calculated at step 250. Wheel slip for the non-driven wheels may be determined via the controller, as a function of non-driven wheel speed, compared to vehicle speed. Similarly, wheel slip for driven wheels may be determined, via the controller, as a function of driven wheel speed compared to vehicle speed. In examples where the vehicle includes a clutch or clutches in the driveline, controlling driven wheel speed/slip may in some examples include controlling one or more clutches configured to transfer engine torque to driven wheels.

It may be understood that, wheel slip for driven wheels, and for non-driven wheels, may in some examples comprise a wheel slip profile for each that is not constant over the course of the launch event. For example, at 250, calculating optimum driven wheel slip may include indicating a particular desired wheel slip when the vehicle initially begins to launch and may include phasing out the wheel slip over time as the vehicle proceeds through launching the vehicle from standstill. Similarly, calculating optimum non-driven wheel slip may include indicating a particular desired wheel slip for non-driven wheels when the vehicle initially launches, and phasing out the wheel slip over time as the vehicle proceeds through launching the vehicle from standstill.

Thus, at 258, brake line pressure may be controlled and wheel torque input may be controlled until wheel slip for non-driven wheels is zero (e.g. wheels not slipping) as well as until wheel slip for driven wheels is zero. At such a point, method 200 may end.

Thus, a method may comprise, in preparation of a launch of a vehicle driven by an engine from rest, spinning a set of vehicle tires via a controller by adjusting a torque of the engine while vehicle brakes are applied for a duration that is a function of real-time pressure sensor readings of the set of tires. In such an example, the set of tires includes tires coupled to driven wheels, and applying brakes for the duration includes applying brakes to non-driven wheels. Such a method may involve converting the real-time pressure sensor readings to temperature readings, and the duration may be dependent on a timeframe for the set of tires reaching a pressure corresponding to a threshold tire temperature. The threshold tire temperature may comprise an optimal tire temperature for maximum grip with the road surface, during the launch event. The threshold tire temperature may be based on a coefficient of friction for a road surface the vehicle is launching from, where the coefficient of friction is determined as a function of at least a speed of wheels coupled to the set of tires, and the torque of the engine. Responsive to an indication that an accelerator pedal has been depressed in response to a request from the controller to a vehicle operator to depress the accelerator pedal, the brakes coupled to non-driven wheels may be released (in a controlled fashion according to a desired wheel slip profile for both driven and non-driven wheels), and torque of the engine may be controlled just after the duration as a function of the road surface and the threshold tire temperature, to propel the vehicle forward.

The real-time pressure sensor readings may comprise pressure sensor readings, communicated at regular intervals (e.g. every 1 second, every 5 seconds, every 10 seconds, every 20 seconds, every 30 seconds, etc.) to the vehicle controller.

Another method may comprise conducting a launch of a vehicle that is powered at least in part via an engine, by spinning a first set of tires (e.g. tires coupled to driven wheels) while a second set of tires (e.g. tires coupled to non-driven wheels) is prevented from rotating, controlling a temperature of the first set of tires to a threshold temperature during the spinning, and maintaining the second set of tires prevented from rotating until the temperature of the first set of tires is substantially equivalent (e.g. within 5% or less) of the threshold tire temperature. The threshold temperature may be a function of a coefficient of friction for a road surface the vehicle is launching from. Furthermore, controlling the temperature of the first set of tires may include controlling a torque of the engine that influencing the spinning of the first set of tires. In such a method, preventing and maintaining the second set of tires from rotating may involve electronically-controlled locking of brakes that function to regulate rotation of the second set of tires. Controlling the temperature of the first set of tires to the threshold temperature may include monitoring a pressure in the first set of tires via tire pressure monitoring sensors, and converting the pressure to temperature.

In such a method, while controlling the temperature of the first set of tires to the threshold temperature, the method may include determining a first target wheels slip profile for the first set of tires and determining a second target wheel slip profile for the second set of tires. In response to the temperature of the first set of tires being substantially equivalent (e.g. within 5% or less) to the threshold temperature, the method may include controlling wheel slip for the first set of tires to the first target wheel slip profile and controlling wheel slip for the second set of tires to the second target wheel slip profile, to launch the vehicle from rest. As an example, the first target wheel slip profile and the second target wheel slip profile are set based on the threshold tire temperature and road surface the vehicle is launching from.

Turning now to FIG. 3, an example timeline 300 for conducting a vehicle launch event, according to the method of FIG. 2, is shown. Timeline 300 includes plot 305, indicating whether the vehicle is stopped, or whether vehicle speed is greater than stopped (+), over time. Timeline 300 includes plot 310, indicating engine speed (e.g. RPM), over time. The engine may be stopped, or may be spinning at a speed greater than stopped (+). Timeline 300 further includes plot 315, indicating engine torque, over time. The engine may produce no torque (0), or a torque greater than no torque (+). Timeline 300 further includes plot 320, indicating wheel speed for driven wheels, over time. Driven wheels may be stopped, or may be spinning at a speed greater than stopped (+). Timeline 300 further includes plot 325, indicating wheel speed for non-driven wheels, which may similarly be stopped, or spinning at a speed greater than stopped (+). Timeline 300 further includes plot 330, indicating an extent to which brakes applied to non-driven wheels, are activated. Brake force to non-driven wheels may be increased (+), or decreased (−), over time. Timeline 300 further includes plot 335, indicating a position of an intake air throttle, over time. The throttle may be open (e.g. fully open), closed (e.g. fully closed), or may be somewhere in between. Timeline 300 further includes plot 340, indicating a position of a brake pedal, over time. The brake pedal may be released (e.g. no brake applied), or may be depressed (+) to varying degrees. Timeline 300 further includes plot 345, indicating accelerator pedal position, over time. Similarly, the accelerator pedal may be released (e.g. no request for vehicle acceleration), or may be depressed (+) to varying degrees. Timeline 300 further includes plot 350, indicating tire temperature corresponding to driven wheels, over time. Tire temperature may increase (+), or decrease (−), over time. Line 351 represents the optimal tire temperature for the launch event, for the given road surface. Timeline 300 further includes plot 355, indicating whether conditions are met for launching the vehicle (yes) or not (no), over time.

At time t0, the vehicle is stopped (plot 305), the engine is also stopped (plots 310 and 315), and accordingly both driven wheels (plot 320) and non-driven wheels (plot 325), are not rotating. With the vehicle stopped and the engine not in operation, wheel brakes to non-driven wheels are not applied (plot 330). The throttle (plot 335) is in a position it was in at a prior key-off event, and the brake pedal (plot 340), as well as the accelerator pedal (plot 345), are not being depressed by a vehicle operator. With the vehicle at a standstill, the tires coupled to driven wheels are at a particular temperature (plot 350), and conditions are not yet met for launching the vehicle (plot 355).

Between time t0 and t1, it may be understood that the vehicle operator has selected, via an HMI, for example, a launch control mode of vehicle operation, discussed above at 206 of method 200. Accordingly, at time t1, the vehicle controller requests the vehicle operator to fully depress the brake pedal. Such a request may be made via the controller through the HMI, in the form of a display message, an audible message, etc. In some examples, the request may additionally or alternatively be made via the controller communicating with a personal computing device (e.g. smart phone), of the vehicle operator, via for example a text message. Accordingly, at time t1, the brake pedal is fully depressed via the vehicle operator (plot 340). Between time t1 and t2, brake line pressure is monitored via, for example, a pressure sensor positioned in the brake line. Based on the brake line pressure, a threshold brake line pressure is set between time t1 and t2, via the controller and/or ABS module.

Accordingly, at time t2, with the threshold brake line pressure established, the ABS system is controlled via the controller and/or ABS module, to activate brakes coupled to non-driven wheels (but not to driven wheels) to at least the threshold brake line pressure (plot 330). More specifically, at time t2, the controller and/or ABS module may command the ABS system to increase hydraulic pressure in a brake line coupled to brakes for the non-driven wheels, thus increasing braking force on the non-driven wheels, until brake line pressure equals or exceeds the threshold brake line pressure. In this way, it may be understood that the non-driven wheels may be locked in place. With the non-driven wheels locked in place, the vehicle operator releases the brake pedal (plot 340).

At or near time t3, the vehicle controller requests the vehicle operator to fully depress the accelerator pedal. Again, such a request may be made via the controller through the HMI, via a personal computing device, etc. Accordingly, at time t3, responsive to the request, the vehicle operator steps down fully on the accelerator pedal (plot 345). With the vehicle operator pressing down on the accelerator pedal, the throttle is fully opened (plot 335). Between time t3 and t4, with the accelerator pedal fully depressed, engine speed increases (plot 310), and accordingly, engine torque increases, as it may be understood that the engine is mechanically coupled to driven wheels in this example timeline. As the engine is producing torque and is mechanically connected to driven wheels, the driven wheels increase speed between time t3 and t4 (plot 320). In other words, driven wheels begin rotating in place between time t3 and t4, yet the vehicle is maintained stationary due to the non-driven wheels being locked. As a result of the driven wheels rotating in place, in contact with the ground surface, between time t3 and t4, tire temperature for tires coupled to the driven wheels, as monitored via TPMS, for example, increases accordingly.

Between time t3 and t4, while not explicitly illustrated, it may be understood that a coefficient of friction for the particular road surface the vehicle is launching from, may be determined. As discussed above, such a coefficient of friction may be determined as a function of engine torque and wheel speed. For example, as engine torque and wheel speed diverge (e.g. wheel speed becomes much greater than engine torque), it may be understood that the coefficient of friction may decrease. Alternatively, as engine torque and wheel speed converge, then the coefficient of friction may increase. In other words, wheel speed may be very high if the road surface is slick (e.g. very smooth) as compared to engine torque, whereas wheel speed may be more closely aligned with engine torque if the road surface is rough.

With the coefficient of friction determined between time t3 and t4, an optimal tire temperature for driven wheels may be determined for the launch event, based on the road surface (e.g. coefficient of friction for the particular road surface), such that the tires grip the road surface to a maximum extent possible. As discussed, the optimal tire temperature may comprise a threshold tire temperature, which may be determined via the controller by querying a lookup table with information pertaining to optimal tire temperature for particular road conditions. In other examples, a mathematical relationship between the coefficient of friction and optimal tire temperature may be utilized, via the controller, to determine the optimal tire temperature for the determined coefficient of friction.

With the optimal tire temperature determined by time t4, tire temperature is controlled to the optimal tire temperature (represented by line 351) between time t4 and t5. As discussed above, tire temperature may be monitored via TPMS coupled to driven wheels. Controlling tire temperature may thus comprise a feedback loop, where a desired tire temperature is set, and where the feedback loop includes calculating an error between the desired tire temperature, and the actual tire temperature, and where the engine is utilized to spin the tires in such a way as to control tire temperature to the desired temperature, where the desired temperature comprises the optimal tire temperature for the particular launch event. As one example, the engine may be controlled to increase engine torque, which may result in driven wheels spinning more rapidly, which may increase tire temperature. Thus, it may be understood that such a control scheme may under control of a proportional integral derivative controller (e.g. PID controller). A box diagram of such a PID controller is illustrated at FIG. 4, and discussed in detail below.

Thus, between time t4 and t5, tire temperature is controlled to the optimal tire temperature, via increasing engine torque and engine speed, where increasing engine torque and speed results in the driven wheels rotating more quickly against the road surface, which further increases tire temperature until the optimal tire temperature is reached at time t5. With the optimal tire temperature reached at time t5, the vehicle controller requests the vehicle operator to release the accelerator pedal (plot 345), and accordingly the throttle returns to its default position (plot 335). Between time t5 and t6, based on the road surface and optimal tire temperature for the launch event, the controller calculates an optimum wheel slip profile for the launch for driven wheels, and an optimum wheel slip profile for the launch for non-driven wheels.

With the optimum wheel slip profile for the launch for both driven and non-driven wheels indicated between time t5 and t6, and with tire temperature at the optimal tire temperature for the launch event such that grip is maximized, at time t6 conditions are indicated to be met for launching the vehicle from standstill (plot 355). With conditions met at time t6, the vehicle controller requests the vehicle operator to fully depress the accelerator pedal. Accordingly, at time t6, the vehicle operator fully depresses the accelerator pedal (plot 345), and thus, the throttle is fully opened (plot 355).

Between time t6 and t7, release of the non-driven wheel brakes (plot 330) is controlled in order to achieve the optimum non-driven wheel slip profile, as well as to contribute to the wheel slip profile for driven wheels. Furthermore, driven wheels are controlled via engine torque transferred to driven wheels, such that the optimum wheel slip profile for driven wheels is additionally achieved. Thus, at time t6, vehicle speed begins increasing (plot 305), and engine speed and torque are controlled (plots 310 and 315) to achieve the optimum driven wheel slip for driven wheels. It may be understood that the optimum wheel slip for driven wheels is further a function of the release of braking from non-driven wheels, and furthermore, non-driven wheel slip is further a function of engine speed and engine torque.

The duration of time between locking or activating the non-driven wheel brakes at time t2, and releasing the non-driven wheel brakes at time t6, may be variable, as discussed. For example, depending on the amount of time it takes for the tires coupled to driven wheels to reach the threshold tire temperature, the duration may be longer or shorter.

It may be understood that the time frame between time t6 and t7 constitutes a time frame where a gear shift is not requested, thus time t6 and t7 represents the first few seconds of the launch event. Accordingly, no gear shift events are indicated, although it may be understood that the transmission may be controlled during the launch event such that higher gears are engaged as the launch proceeds.

Turning now to FIG. 4, an example illustration 400 of a PID controller for controlling tire temperature to an optimal tire temperature for maximizing grip for a launch event, is depicted. Specifically, an optimal tire temperature 405 may be determined as a function of the coefficient of friction for the particular road surface, as discussed above. An error 410 between the optimal tire temperature 405 and actual tire temperature 420, as monitored via TPMS 425 is output 415 to PID controller 430, the output 435 of which is used to regulate engine 440. For example, depending on the error between the actual tire temperature and the optimal tire temperature, the engine may be controlled in such a way as to reduce the error to zero. Thus, in an example where actual tire temperature is below the desired or optimal tire temperature, engine torque, for example, may be increased so that the tires are spun faster against the ground surface, which may result in tire temperature increasing. It may be understood that, while the TPMS may measure pressure of tires, tire pressure may be converted to temperature via the ideal gas law, as discussed above. Furthermore, it may be understood that, as discussed herein, such control over tire temperature may relate to tires corresponding to driven wheels during a launch event. It may be understood that, for FIG. 4, engine 440 may comprise the same engine as engine 10 depicted at FIG. 1, and TPMS 425 may comprise the same TPMS as that depicted at FIG. 1.

In this way, for a launch event where optimal performance, for example optimal vehicle acceleration, is desired, tire temperature may be controlled to an optimal tire temperature as a function of road surface, such that a maximum grip may be attained for the launch of the vehicle. Such steps may improve performance as opposed to vehicles that increase tire temperature for a launch event, but where tire temperature is not controlled to an optimal tire temperature as a function of a coefficient of friction for the particular road surface.

The technical effect is to recognize that spinning driven wheels at a launch event may enable a determination of a coefficient of friction for a particular road surface for the launch event, and based on the coefficient of friction, an optimal tire temperature may be calculated or indicated. Thus, a further technical effect is to recognize that, in response to determining the optimal tire temperature for a particular launch event as a function of road surface, the engine may be controlled and tire temperature monitored via TPMS, such that tire temperature may be accurately controlled to the optimal temperature for maximal grip at the time of launching the vehicle from standstill.

The systems described herein, and with regard to FIG. 1, along with the methods described herein, and with regard to FIG. 2, may enable one or more systems and one or more methods. In one example, a method comprises in preparation of a launch of a vehicle driven by an engine from rest, spinning a set of vehicle tires via a controller by adjusting a torque of the engine while vehicle brakes are applied for a duration that is a function of real-time pressure sensor readings of the set of tires. In a first example of the method, the method further includes wherein the set of tires includes tires coupled to driven wheels. A second example of the method optionally includes the first example, and further includes wherein applying brakes for the duration includes applying brakes to non-driven wheels. A third example of the method optionally includes any one or more or each of the first through second examples, and further comprises converting the real-time pressure sensor readings to temperature readings; and wherein the duration is dependent on a timeframe for the set of tires reaching a pressure corresponding to a threshold tire temperature. A fourth example of the method optionally includes any one or more or each of the first through fourth examples, and further includes wherein the threshold tire temperature includes an optimal tire temperature for grip during the launch. A fifth example of the method optionally includes any one or more or each of the first through fourth examples, and further includes wherein the threshold tire temperature is based on a coefficient of friction for a road surface that the vehicle is launching from. A sixth example of the method optionally includes any one or more or each of the first through fifth examples, and further comprises indicating a speed of wheels coupled to the set of tires while the set of tires is spinning; and where the coefficient of friction is determined as a function of at least the speed of wheels coupled to the set of tires, and the torque of the engine. A seventh example of the method optionally includes any one or more or each of the first through sixth examples, and further comprises releasing brakes subsequent to an indication that an accelerator pedal has been depressed responsive to a request from the controller to a vehicle operator to depress the accelerator pedal, and controlling the torque of the engine just after the duration as a function of the road surface and the threshold tire temperature to propel the vehicle forward.

Another example of a method comprises conducting a launch of a vehicle that is powered at least in part via an engine by spinning a first set of tires while a second set of tires is prevented from rotating, controlling a temperature of the first set of tires to a threshold temperature during the spinning; and maintaining the second set of tires prevented from rotating until the temperature of the first set of tires is substantially equivalent to the threshold tire temperature. In a first example of the method, the method further includes wherein the threshold temperature is a function of a coefficient of friction for a road surface the vehicle is launching from. A second example of the method optionally includes the first example, and further includes wherein controlling the temperature of the first set of tires includes controlling a torque of the engine that influences the spinning of the first set of tires. A third example of the method optionally includes any one or more or each of the first through second examples, and further includes wherein preventing and maintaining the second set of tires from rotating involves electronically-controlled locking of brakes that function to regulate rotation of the second set of tires. A fourth example of the method optionally includes any one or more or each of the first through third examples, and further includes wherein controlling the temperature of the first set of tires to the threshold temperature includes monitoring a pressure in the first set of tires via tire pressure monitoring sensors; and converting the pressure to temperature. A fifth example of the method optionally includes any one or more or each of the first through fourth examples, and further comprises while controlling the temperature of the first set of tires to the threshold temperature, determining a first target wheel slip profile for the first set of tires, determining a second target wheel slip profile for the second set of tires; and in response to the temperature of the first set of tires being substantially equivalent to the threshold temperature, controlling wheel slip for the first set of tires to the first target wheel slip profile and controlling wheel slip for the second set of tires to the second target wheel slip profile to launch the vehicle from rest. A sixth example of the method optionally includes any one or more or each of the first through fifth examples, and further includes wherein the first target wheel slip profile and the second target wheel slip profile are set based on the threshold tire temperature and road surface the vehicle is launching from.

A system for a vehicle comprises an engine; a first set of tires coupled to a first set of wheels, and a second set of tires coupled to a second set of wheels; one or more tire pressure monitoring sensors coupled to at least the first set of tires; an antilock brake system including one or more brakes coupled to the second set of tires; and a controller storing instructions in non-transitory memory that, when executed, cause the controller to, at a vehicle launch event: electronically lock the second set of tires via the one or more brakes coupled to the second set of tires; request a vehicle operator to step down fully on an accelerator pedal to deliver engine torque from the engine to the first set of tires such that the first set of tires rotate in place; calculate a coefficient of friction for a road surface while the first set of tires is rotating in place; determine an optimal tire temperature for the first set of tires as a function of the given coefficient of friction; and regulate engine torque to control temperature of the first set of tires to the optimal tire temperature while maintaining the second set of tires electronically locked, where controlling temperature of the first set of tires includes monitoring pressure in the first set of tires via the tire pressure monitoring sensors, and converting pressure readings to temperature readings. In a first example of the system, the system further comprises one or more reaction torque sensors for measuring engine torque; one or more first wheel speed sensors coupled to the first set of wheels; and wherein the controller stores further instructions to calculate the coefficient of friction for the road surface while the first set of tires is rotating in place based on measured engine torque and speed of the first set of wheels. A second example of the system optionally includes the first example, and further includes wherein the controller stores further instructions to calculate a first target wheel slip profile for the first set of tires and calculate a second target wheel slip profile for the second set of tires while control temperature of the first set of tires to the optimal tire temperature while maintaining the second set of tires electronically locked. A third example of the system optionally includes any one or more or each of the first through second examples, and further includes wherein the controller stores further instructions to calculate the first wheel slip profile and the second wheel slip profile based on the optimal tire temperature and the coefficient of friction of the road surface. A fourth example of the system optionally includes any one or more or each of the first through third examples, and further includes wherein the controller stores further instructions to, in response to temperature of the first set of tires being substantially equivalent to the optimal tire temperature, conduct a controlled release of the one or more brakes coupled to the second set of tires and regulate engine torque in order to control the first set of tires to the first target wheel slip profile and to control the second set of tires to the second target wheel slip profile, to launch the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
in preparation of a launch of a vehicle driven by an engine from rest, spinning a set of vehicle tires via a controller by adjusting a torque of the engine while vehicle brakes are applied for a duration that is a function of real-time pressure sensor readings of the set of vehicle tires.

2. The method of claim 1, wherein the set of vehicle tires includes vehicle tires coupled to driven wheels.

3. The method of claim 2, wherein applying the vehicle brakes for the duration includes applying the vehicle brakes to non-driven wheels.

4. The method of claim 1, further comprising converting the real-time pressure sensor readings to temperature readings; and
wherein the duration is dependent on a timeframe for the set of vehicle tires reaching a pressure corresponding to a threshold tire temperature.

5. The method of claim 4, wherein the threshold tire temperature includes an optimal tire temperature for grip during the launch.

6. The method of claim 4, wherein the threshold tire temperature is based on a coefficient of friction for a road surface that the vehicle is launching from.

7. The method of claim 6, further comprising indicating a speed of wheels coupled to the set of vehicle tires while the set of vehicle tires is spinning; and where the coefficient of friction is determined as a function of at least the speed of wheels coupled to the set of vehicle tires, and the torque of the engine.

8. The method of claim 6, further comprising releasing the vehicle brakes subsequent to an indication that an accelerator pedal has been depressed responsive to a request from the controller to a vehicle operator to depress the accelerator pedal, and controlling the torque of the engine just after the duration as a function of the road surface and the threshold tire temperature to propel the vehicle forward.

9. A method, comprising:
conducting a launch of a vehicle that is powered at least in part via an engine by spinning a first set of tires while a second set of tires is prevented from rotating, controlling a temperature of the first set of tires to a threshold tire temperature during the spinning; and
maintaining the second set of tires prevented from rotating until the temperature of the first set of tires is substantially equivalent to the threshold tire temperature,
wherein controlling the temperature of the first set of tires to the threshold tire temperature includes monitoring a pressure in the first set of tires via tire pressure monitoring sensors; and
converting the pressure to temperature.

10. The method of claim 9, wherein the threshold tire temperature is a function of a coefficient of friction for a road surface the vehicle is launching from.

11. The method of claim 9, wherein the controlling the temperature of the first set of tires includes controlling a torque of the engine that influences the spinning of the first set of tires.

12. The method of claim 9, wherein preventing and maintaining the second set of tires from rotating involves electronically-controlled locking of brakes that function to regulate rotation of the second set of tires.

13. The method of claim 9, further comprising, while controlling the temperature of the first set of tires to the threshold tire temperature, determining a first target wheel slip profile for the first set of tires, determining a second target wheel slip profile for the second set of tires; and
in response to the temperature of the first set of tires being substantially equivalent to the threshold tire temperature, controlling wheel slip for the first set of tires to the first target wheel slip profile and controlling wheel slip for the second set of tires to the second target wheel slip profile to launch the vehicle from rest.

14. The method of claim 13, wherein the first target wheel slip profile and the second target wheel slip profile are set based on the threshold tire temperature and a road surface the vehicle is launching from.

15. A system for a vehicle, comprising:
an engine;
a first set of tires coupled to a first set of wheels, and a second set of tires coupled to a second set of wheels;
one or more tire pressure monitoring sensors coupled to at least the first set of tires;
an antilock brake system including one or more brakes coupled to the second set of tires; and
a controller storing instructions in non-transitory computer readable memory that, when executed, cause the controller to, at a vehicle launch event:
electronically lock the second set of tires via the one or more brakes coupled to the second set of tires;
request a vehicle operator to step down fully on an accelerator pedal to deliver engine torque from the engine to the first set of tires such that the first set of tires rotate in place;
calculate a coefficient of friction for a road surface while the first set of tires is rotating in place;
determine an optimal tire temperature for the first set of tires as a function of the coefficient of friction; and
regulate engine torque to control temperature of the first set of tires to the optimal tire temperature while maintaining the second set of tires electronically locked, where controlling a temperature of the first set of tires includes monitoring pressure in the first set of tires via the one or more tire pressure monitoring sensors, and converting pressure readings to temperature readings.

16. The system of claim 15, further comprising:
one or more reaction torque sensors for measuring engine torque;
one or more first wheel speed sensors coupled to the first set of wheels; and
wherein the controller stores further instructions to calculate the coefficient of friction for the road surface while the first set of tires is rotating in place based on measured engine torque and speed of the first set of wheels.

17. The system of claim 15, wherein the controller stores further instructions to calculate a first target wheel slip profile for the first set of tires and calculate a second target wheel slip profile for the second set of tires while controlling the temperature of the first set of tires to the optimal tire temperature while maintaining the second set of tires electronically locked.

18. The system of claim 17, wherein the controller stores even further instructions to calculate the first target wheel slip profile and the second target wheel slip profile based on the optimal tire temperature and the coefficient of friction of the road surface.

19. The system of claim 17, wherein the controller stores even further instructions to, in response to the temperature of the first set of tires being substantially equivalent to the optimal tire temperature, conduct a controlled release of the one or more brakes coupled to the second set of tires and regulate engine torque in order to control the first set of tires to the first target wheel slip profile and to control the second set of tires to the second target wheel slip profile, to launch the vehicle.

* * * * *